W. H. RIPPIN.
KNEADING MACHINERY.
APPLICATION FILED OCT. 21, 1907. RENEWED JULY 8, 1909.
931,087.
Patented Aug. 17, 1909.
2 SHEETS—SHEET 2.
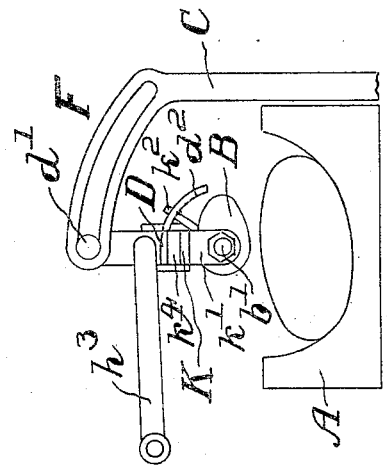
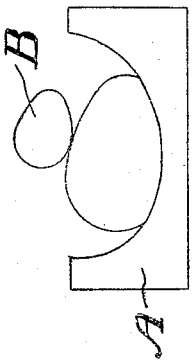
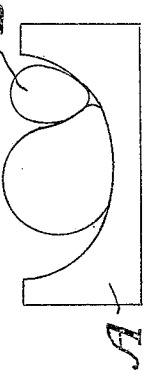
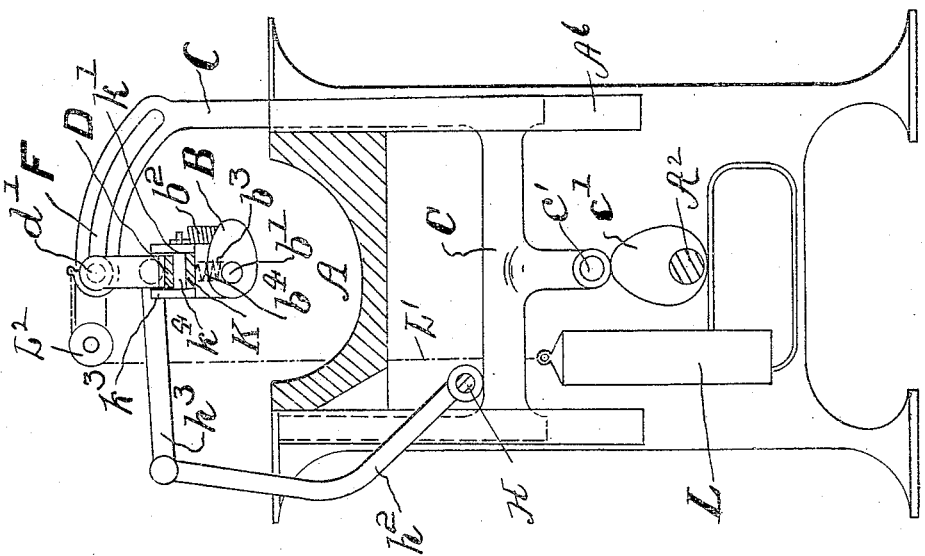

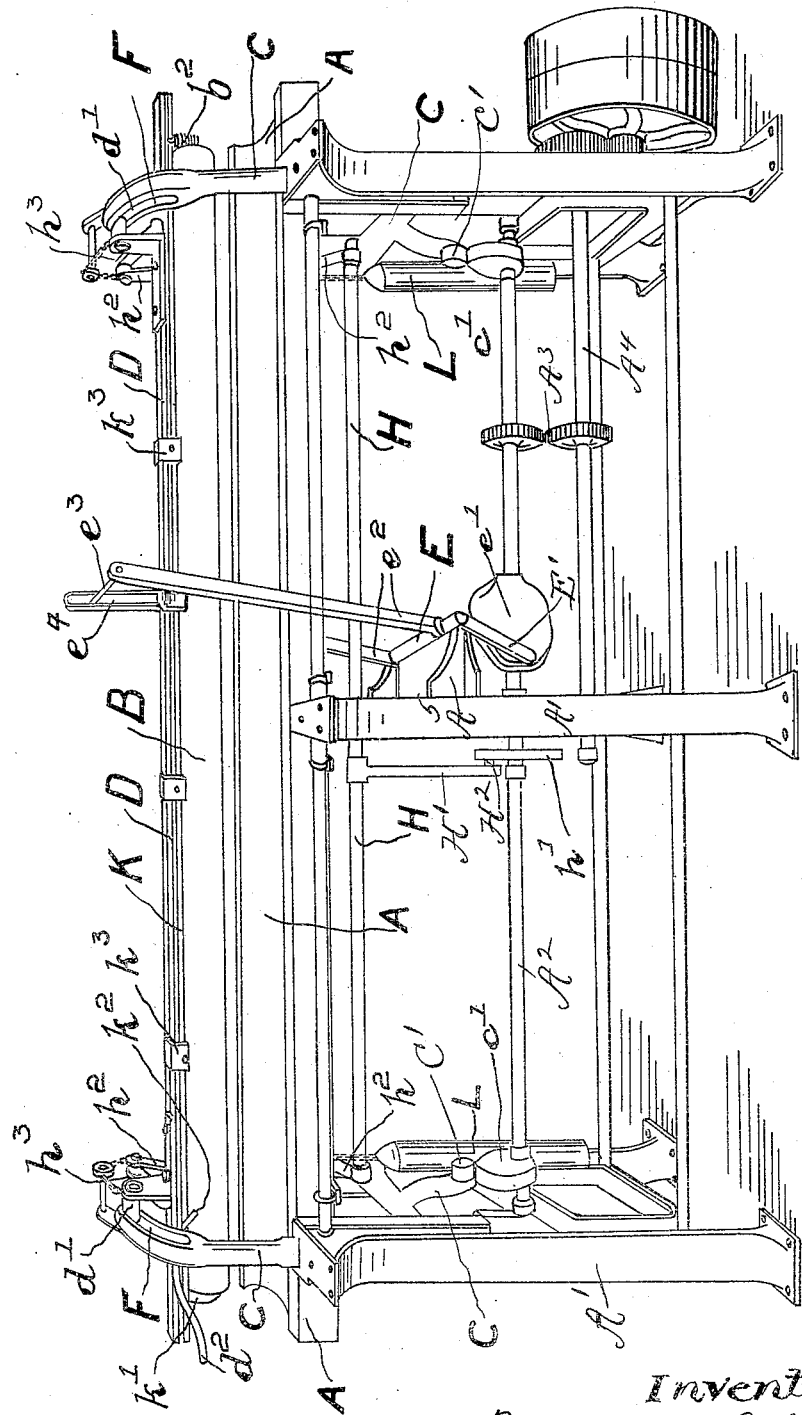

UNITED STATES PATENT OFFICE.

WILLIAM HEYCOCK RIPPIN, OF LEICESTER, ENGLAND.

KNEADING MACHINERY.

No. 931,087.      Specification of Letters Patent.      Patented Aug. 17, 1909.

Application filed October 21, 1907, Serial No. 398,390. Renewed July 8, 1909. Serial No. 506,617.

*To all whom it may concern:*

Be it known that I, WILLIAM HEYCOCK RIPPIN, a British subject, residing at 2 Sarah street, Leicester, in the county of Leicester, England, have invented certain new and useful Improvements in Kneading Machinery; and I hereby declare that the following is a full, clear, and exact description of the same.

This invention relates to a kneading machine in which the pieces of dough are progressively rolled or squeezed in a kneading trough by the successive movements of the kneader in the same manner as if kneaded by hand, as hereinafter set forth and pointed out in the claims.

For an understanding of the invention reference is to be had to the following description and to the accompanying drawings, in which, Figure 1, is a perspective view of the kneading machine. Fig. 2, is a transverse section of the same. Fig. 3, is an end elevation of a part of the machine showing the position of the kneader at the commencement of the operation, and Figs. 4 and 5 are diagrams illustrating the progressive positions of the kneader.

Like characters of reference refer to like parts throughout the specification and drawings.

The kneading trough A is supported by the main frame A' and operating within the kneading trough A is the kneader B. Vertically movable in guideways $A^6$ formed in the main frame A' at one side of the kneading trough are slides C having their upper ends extending above, and in a curved direction over the kneading trough, and formed in the curved ends are segmental slots F. Laterally movable in the segmental slots F are pins or rollers $d'$, secured to the runner D, by which the latter is movably supported by the slides. Suspended from the runner D, by brackets $k^3$, is a supporting member K, and projecting from the supporting member K are vertically slotted brackets $k'$ in the slots of which are journaled the trunnions $b'$ of the kneader B. Interposed between the supporting member K, and the runner D are rollers $k^4$. Connected to the brackets $k^3$ and to the kneader B are springs $b^2$ to normally hold the kneader in, and return it to, the position shown in Figs. 2 and 3. Contained in the slotted brackets $k'$ between the springs $b^2$ and the supporting member K are springs $b^3$, to yieldingly resist the impact of the kneader on the dough. The brackets $k^3$ are movable lengthwise on the runner D to provide for the lengthwise movement of the kneader B in the kneading trough A.

A rock shaft E is journaled in bearings $a^5$ projecting from the main frame A' and connected to the rock shaft E is an arm E' engaged by a cam $e'$. Projecting from the rock shaft E are two lever arms $e^2$ which extend above the runner D and connected to the lever arms $e^2$ above the runner D, is a cross bar $e^3$, which operates through a slotted arm $e^4$ fixed to the supporting member K. Journaled in the main frame is a cam shaft $A^2$ and mounted on the cam shaft $A^2$ are cams $c'$ which engage with rollers C' revolubly connected to the slides C. The cam $e'$ is mounted on the cam shaft $A^2$ so that it will cause the action of the rock shaft E during the revolution of the cam shaft and co-incident with the actuation of the slides C.

Journaled in the main frame A' is a rock shaft H having an arm H' provided with a roller $H^2$ which engages with a cam $h'$ mounted on the cam shaft $A^2$. The rock shaft H is provided with lever arms $h^2$ connected by links $h^3$ with the runner D to cause the lateral movement of the runner during the actuation of the slides. The lateral movement of the runner D shifts the kneader B from the position shown in Fig. 4, to that shown in Fig. 5, and vice versa.

Journaled in the main frame A' is a drive shaft $A^4$ and mounted on the drive shaft $A^4$ and cam shaft $A^2$ are the spur wheels of an intermeshing gear $A^3$. Motion is transmitted from the drive shaft $A^4$ to the cam shaft $A^2$ by means of the intermeshing gear $A^3$, and during the revolution of the cam shaft $A^2$, the cams $c'$ engaging with the rollers C' lower and raise the slides C to respectively bring the kneader B into contact with the dough in the kneading trough A and lift it from contact therewith.

The lowering movement of the slides causes the kneader B to press the dough against the bottom of the kneading trough with a yielding pressure permitted by the slotted brackets $k'$ and springs $b^3$. The cam $e'$ operates to rock the shaft E to actuate the lever arms $e^2$ to move the kneader B lengthwise in the kneading trough so that the dough will be stretched and pulled. The cam $h'$ operates to actuate the rock shaft H and lever arms $h^2$ so that they will move the rollers $d'$ from the position shown in Figs. 1 and 2, to the opposite end of the slots F, and shift the kneader from the position shown in Fig. 4, to that shown in Fig. 5, to draw down and tighten the dough and partly turn it in the kneading trough in a similar manner to the operation by hand. The continued revolution of the cam shaft lifts the slides C to the positions shown in Figs. 1 and 2 and to return the supported parts, that is the kneader, supporting member and runner to that position, weights L are attached by flexible members L' to the rollers $d'$, the flexible members L' passing over idlers $L^2$ revolubly connected to the slides C. When the kneader attains the position shown in Fig. 5, it is given a partial turn by the engagement of the arm $k^2$ with the cam $d^2$. The arm $k^2$ is connected to the kneader B and the cam $d^2$ is connected to the runner D. The arm $k^2$ during the lengthwise movement of the kneader engages with the cam $d^2$ and by its engagement causes the partial rotation of the kneader, to effect the partial turning movement of the dough, the restoration of the kneader B from the position shown in Fig. 5, to that shown in Figs. 2 and 3, being effected by the springs $b^2$.

Having thus fully described my invention, what I claim as new and desire to secure by Letters Patent is:—

1. A kneading machine comprising a kneading trough, a kneader, means for raising and lowering the kneader, and means for causing the lengthwise movement of the kneader.

2. A kneading machine comprising a kneading trough, a kneader, means for raising and lowering the kneader, and means for causing the lateral movement of the kneader.

3. A kneading machine comprising a kneading trough, a kneader, means for raising and lowering the kneader, and means for partly turning the kneader in the kneading trough.

4. A kneading machine comprising a kneading trough, a kneader, means for raising and lowering the kneader, means for moving the kneader lengthwise, and other means for moving the kneader laterally, of the kneading trough.

5. A kneading machine comprising a kneading trough, a kneader, means for raising and lowering the kneader, means for moving the kneader lengthwise, other means for moving the kneader laterally, of the kneading trough, and means for partially turning the kneader.

6. A kneading machine comprising a main frame, a kneading trough, movable slides, a kneader supported by the movable slides means for actuating the slides to position the kneader relatively to the kneading trough, and means for moving the kneader lengthwise of the kneading trough.

7. A kneading machine comprising a main frame, a kneading trough supported by the main frame, slides movable in the main frame, having slotted parts, a runner, rollers connected to the runner and movable in the slotted parts of the slides, a kneader movably supported from the runner, means for raising and lowering the slides, and means for causing the lengthwise movement of the kneader.

8. A kneading machine comprising a main frame, a kneading trough supported by the main frame, slides movable in the main frame, having slotted parts, a runner, rollers connected to the runner and movable in the slotted parts of the slides, a kneader movably supported from the runner, means for raising and lowering the slides, means for causing the lengthwise movement of the kneader, and means for causing the lateral movement of the runner and kneader.

9. A kneading machine comprising a main frame, a kneading trough supported by the main frame, slides movable in the main frame, having slotted parts, a runner, rollers connected to the runner and movable in the slotted parts of the slides, a kneader movably supported from the runner, means for raising and lowering the slides, means for causing the lengthwise movement of the kneader, means for causing the lateral movement of the runner and kneader and means for partly turning the kneader.

10. A kneading machine comprising a kneading trough, a kneader, means for raising and lowering the kneader, and means independent of the raising and lowering means for causing the lengthwise movement of the kneader.

11. A kneading machine comprising a kneading trough, a kneader, means for raising and lowering the kneader, means independent of the raising and lowering means for causing the lengthwise movement of the kneader and operable means for actuating the raising and lowering means and the means for causing the lengthwise movement of the kneader.

12. A kneading machine comprising a kneading trough, a kneader, means for raising and lowering the kneader, means for actuating the raising and lowering means, and means for partly turning the kneader in the kneading trough.

In witness whereof I have hereunto set my hand in the presence of two witnesses.

WILLIAM HEYCOCK RIPPIN.

Witnesses:
  LEWIS WM. GOOLD,
  WALTER H. J. BARTLAM.